United States Patent Office 3,482,528
Patented Dec. 9, 1969

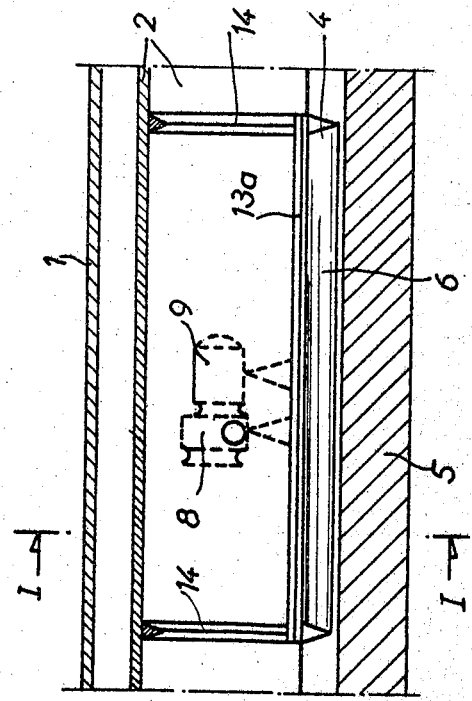
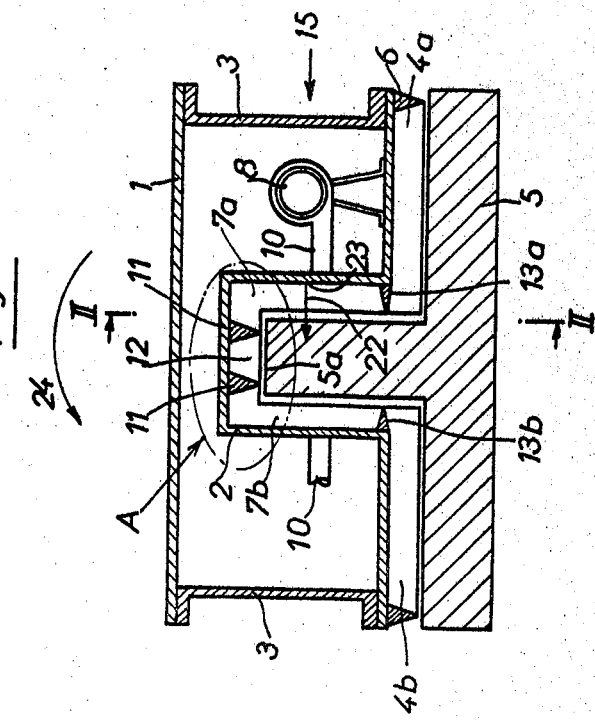

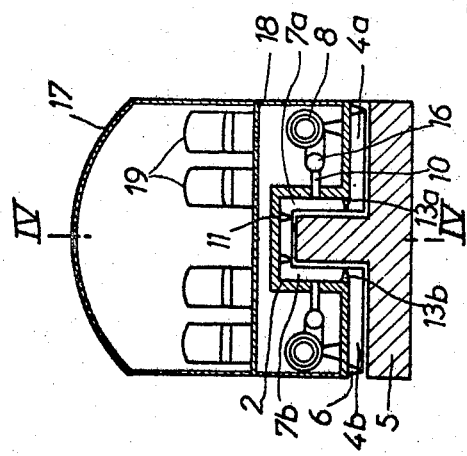
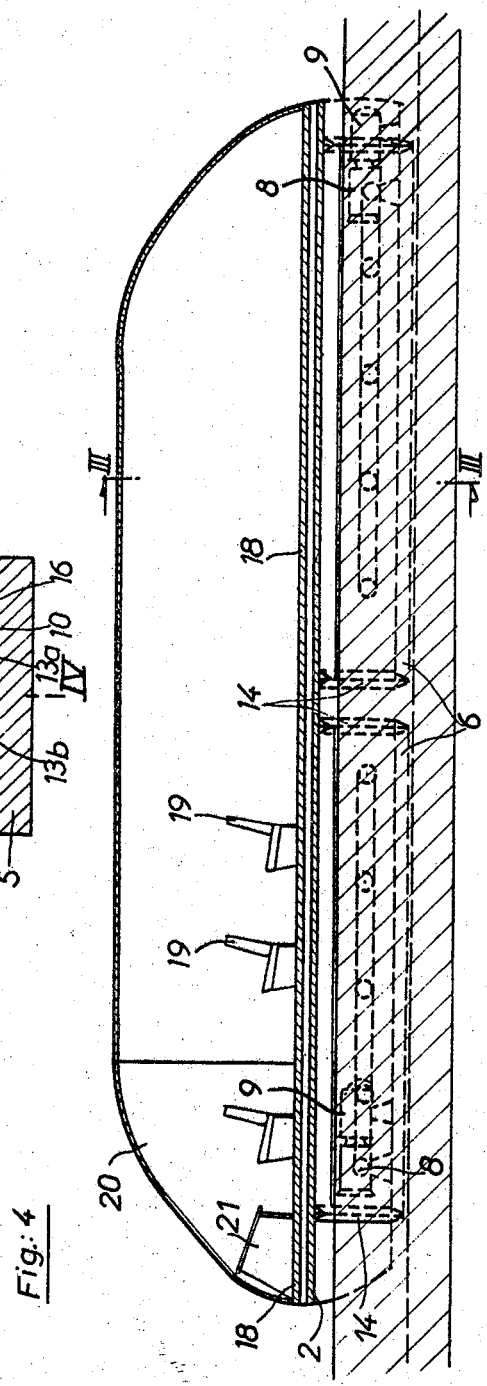

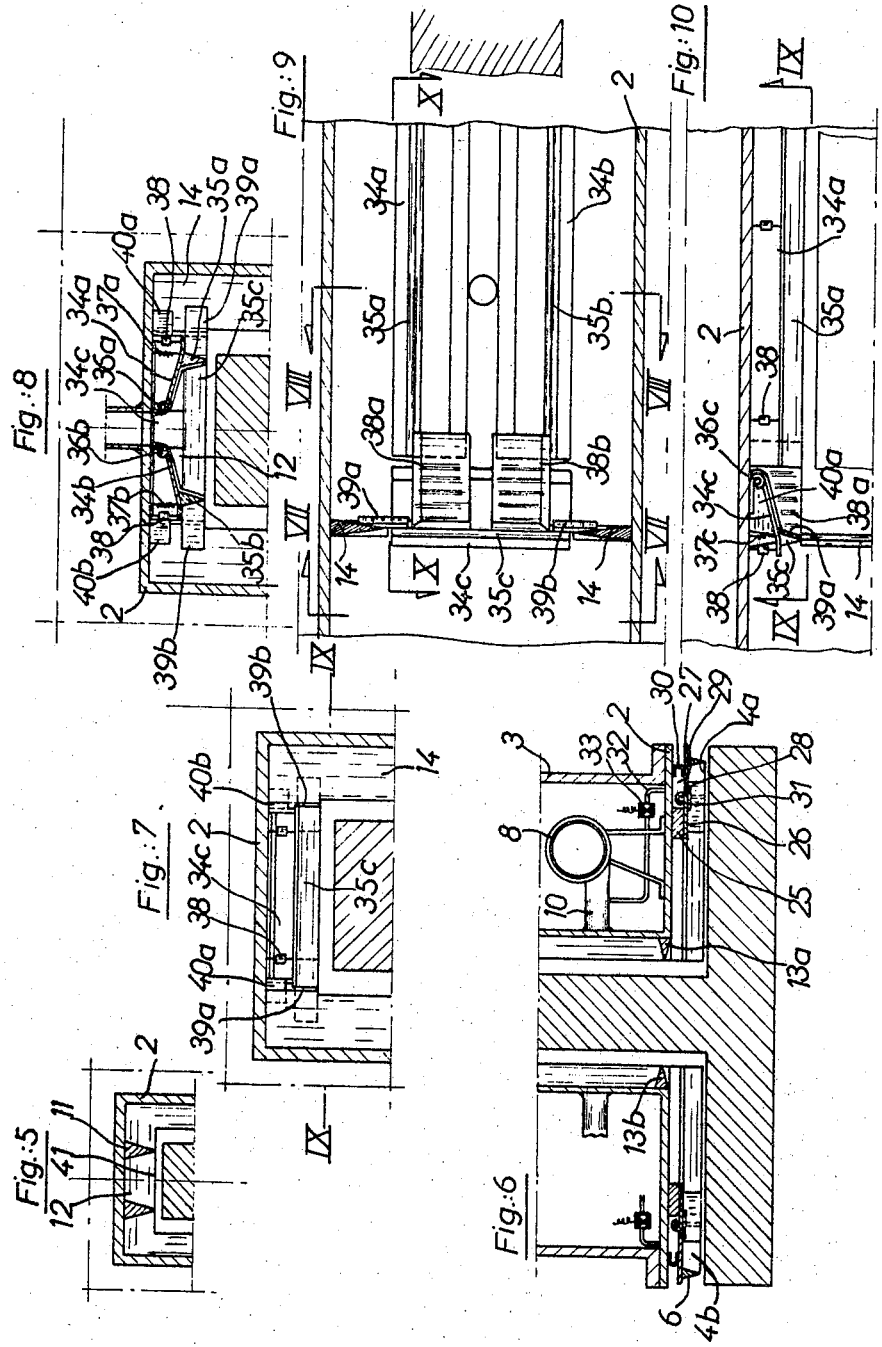

3,482,528
SUPPLY SYSTEMS FOR GROUND EFFECT MACHINES ASSOCIATED TO A TRACK
Paul Francois Guienne, Paris, and Jean Henri Bertin, Neuilly-sur-Seine, France, assignors to Bertin & Cie, Plaisir, France, a company of France
Filed Nov. 20, 1967, Ser. No. 684,159
Claims priority, application France, Nov. 23, 1966, 84,693
Int. Cl. B60v 3/04
U.S. Cl. 104—23                            15 Claims

ABSTRACT OF THE DISCLOSURE

A ground effect machine comprising one guiding cushion cooperating with a substantially vertical surface and a supporting cushion cooperating with a substantially horizontal surface, said supporting cushion and said guiding cushion being adjoining and separated by a common wall cooperating with one track surface, one of said cushions being supplied with fluid under pressure directly, the other being supplied by leakage of this fluid between said common wall and the surface of the track.

---

It is already known to have vehicles supported and guided above a track by pressure-fluid cushions, hereinafter referred to as "air cushions."

It has been proposed to use a track of inverted-T shape and to position the supporting air cushions facing the horizontal portions of the track. In such an arrangement guidance was provided by air cushions bearing against the vertical portions or guiding rail of the track, and these air cushions were formed in chambers which were not contiguous with the chambers of the supporting air cushions and the walls of which extended from the structure of the vehicle up to the associated thrust surface.

Such a disposition of the air cushion chambers offers great stability under lateral loads but results in a considerably large total leakage perimeter on the air cushions, which perimeter is the sum of the perimeters of the individual chambers containing the air cushions.

The subject devices of the present invention permit, without impairing the stability of the vehicle, of notably reducing the total leakage perimeter of the cushions and hence the power required to supply the same.

In accordance with this invention, a supporting air cushion and an adjacent guiding air cushion are contiguous, and their longitudinal partitioning wall extends from the vehicle structure to the associated guiding surface and the other longitudinal wall of the guiding air cushion extends from the vehicle structure to the end-face of the guiding rail formed on the track. The supporting air cushion may be at least partly supplied, along the common wall, by the leakage flow from the adjacent guiding air cushion, the pressure of which is preferably markedly greater than that of the supporting air cushion. The leakage clearance between the end-face of said guiding rail and the free edges of the associated walls is preferably approximately equal to the tolerance for the flatness of said end-face, while the corresponding clearance at the free edge of the common wall may be equal to five times the tolerance for the flatness of the guiding surface.

Another object of the invention is to reduce the total leakage perimeter of the air cushions by segregating from the surrounding atmosphere the space bounded by the guiding air cushion walls opposite the end-face of the guiding track rail and where necessary to supply such space with pressure-fluid.

Still another object of the invention is to use a pressure-fluid source, the characteristic functional curve of which is such that, in the region of the nominal operating conditions, the fluid output decreases as the output pressure increases, and vice versa. Such a source may comprise any convenient means such as a compressor, a turbo-jet engine, etc. Preferably, a separate supply system is provided for each pair consisting of a guiding air cushion and the contiguous supporting air cushion in order to avoid interfering with the supplies to the different sets of cushions.

A further object of the invention is to make the supporting air cushion confining walls capable of keeping the leakage clearance substantially constant, as described in the application for Letters Patent No. 70,695 filed by the applicants on July 25, 1966 in France.

The description which follows with reference to the accompanying non-limitative exemplary drawings will give a clear understanding of how the invention can be carried into practice.

In the drawings:

FIGURE 1 is a schematic sectional view of a device according to the invention, taken on the line I—I of FIGURE 2.

FIGURE 2 is a partial section taken on the line II—II of FIGURE 1.

FIGURE 3 is a cross-sectional view of a vehicle according to the invention intended for passenger transport.

FIGURE 4 is a section on the line IV—IV of FIGURE 3.

FIGURE 5 is a fragmental sectional view of an alternative embodiment of the detail A of FIGURE 1.

FIGURE 6 is an alternative embodiment of the support shown in FIGURES 1 and 2.

FIGURE 7 is a sectional view on the line VII—VII of FIGURE 9, showing a device for maintaining a substantially constant leakage clearance above the end-face of the guiding rail of the track.

FIGURE 8 shows the device of FIGURE 7 in vertical section through the line VIII—VIII of FIGURE 9.

FIGURE 9 shows the device of FIGURE 7 in horizontal section through the line IX—IX of FIGURES 7 and 10.

FIGURE 10 shows the device of FIGURE 7 in vertical section through the line X—X of FIGURE 9.

Referring first to FIGURES 1 and 2, there is shown thereon a load-supporting platform 1 fixed to a chassis 2 by means of uprights 3.

When the vehicle is travelling, the platform is supported and guided by air cushions above an inverted T-shaped track 5. Supporting air cushions 4a and 4b cooperate with substantially horizontal track surfaces. These cushions are bounded by walls 6 made of some deformable material such as rubber or one of the so-called plastics, of which examples are neoprene, nitrile, butyl, or of an elastomer and more specifically polyurethane elastomers, and the sections of said cushions are preferably trapezoidal or triangular.

The device includes a number of cushions 4 arranged along the length of the vehicle, one of which is depicted in simple form in FIGURE 2.

Guidance of the platform is ensured by substantially rectangular air cushions 7a and 7b thrusting against the vertical track rail. Preferably, each cushion 4a or 4b has a cushion 7a and 7b contiguous thereto and advantageously of the same length.

A compressor 8 driven by an engine 9 is adapted for output into a duct 10 having port inside cushion 7a. Cushion 7b is supplied in the same way by a second compressor (not shown). Manifestly, any other convenient device may be employed for supplying gas under pressure to the cushions.

The front and rear faces of the cushions 7 (assuming the platform to be travelling in the normal direction) are bounded by walls 14 made of deformable material. Walls 11 rigid with the vehicle chassis 2 extend to the end-face 5a of the guiding track rail and thereby segregate the cushions 7a and 7b from the space 12 open to the surrounding atmosphere. Alternatively, as shown in FIGURE 5, the leakage perimeter of the contours can be reduced by using wall elements 41 to isolate the space 12 from the environment and by possibly supplying such space with pressure-fluid from a compressor 8, for example. A plurality of walls 11 may be used, and such walls may be caused to form a labyrinth seal with advantage.

The guiding air cushions 7a and 7b are separated from the supporting air cushions 4a and 4b by walls 13a and 13b fixed to chassis 2 and having a large leakage clearance (e.g. five times the tolerance for flatness of the guiding surface), and these supporting cushions are supplied with air under pressure by the leakage flow from the cushions 7a and 7b past the walls 13a and 13b. Preferably, the pressure in cushions 7a and 7b is maintained substantially higher than that in the supporting cushions contiguous thereto.

The principle of operation of the subject device of this invention is as follows:

It is assumed that the system is in equilibrium at the instant T in the position shown in FIGURE 1, in which the platform is disposed symmetrically with respect to the center plane through the track.

Assume that at the instant $T+\epsilon$ a lateral force is exerted against the side of the vehicle in the direction of arrow 15. This force may be resolved into a force 22 applied at the centre of pressure 23 of the guiding cushions and into a moment acting in the direction of arrow 24.

The force 22 shifts the vehicle leftwards of FIGURE 1 by an amount $dy$. It follows that the leakage clearance between wall 13a and the guiding rail decreases by the same amount $dy$ while the distance between wall 13b and said rail increases by $dy$.

Provided that suitable initial values are chosen for the leakage clearance between wall 13a and the guiding rail, for the pressure in guiding air cushion 7a, and for the slope of the characteristic functional curve of the compressor, then the leakage flow rate may decrease sufficiently for the pressure in the supporting cushion 4a to drop despite the increase in the pressure of guiding air cushion 7a.

Similarly, the leakage clearance between wall 13b and the rail increases by $dy$, and both the leakage flow rate feeding the supporting cushion 4b and the pressure in the latter increase, while the pressure in the guiding cushion 7b decreases by reason of the compressor characteristics.

The pressure differential across guiding cushions 7a and 7b accordingly balances the force 22.

At the same time, the moment 24 which has a canting effect on the vehicle is balanced by changes in pressure in cushions 4a and 4b.

Reference is next had to FIGURES 3 and 4 for a showing of a passenger transport vehicle cooperating with an inverted-T-shaped guiding rail and comprising an air cushion supply system similar to that of FIGURE 1. Like parts to those shown in FIGURE 1 bear like reference numerals.

The vehicle includes a chassis 2 which forms one of the walls bounding the air cushions 4a, 4b, 7a, 7b cooperating with an inverted-T-shaped track 5.

The system comprises two cushions 4a (or 4b) on each side of the guiding rail of the track, and these cushions bear against substantially horizontal track surfaces. Walls 6 made of a deformable material segregate said cushions laterally from the surrounding atmosphere.

Guiding cushions 7a and 7b contiguous with supporting cushions 4a and 4b bear against the vertical surfaces of the track guiding rail. Each is supplied by a compressor 8 which operates for output into a manifold 16 to which are connected ducts 10 debouching into the chamber containing the cushion.

Cushions 7a and 7b are bounded by vertical walls 14 at their front and rear, by walls 11 at the top, and by walls 13a and 13b at the bottom. Walls 14, 11 and 13 are made of deformable material and have a substantially triangular section. The space 12 included between the two walls 11 is vented to the open atmosphere. Walls 13b providing a substantial leakage clearance confine guiding cushions 7a and 7b on their sides common with supporting cushions 4a and 4b, the latter being supplied by means of the leaks from the guiding cushions beneath the walls 13a and 13b.

The vehicle chassis is surmounted by a body 17 and a floor 18 which jointly bound the useful space within the vehicle, which space is equipped with passenger seats 19.

At the forward end of the vehicle is a driver's cab 20 equipped with a control console 21. The vehicle further includes propulsion means (not shown) consisting for instance of an airscrew driven by a powerplant.

In the constructional form shown in FIGURE 6, the supporting air cushions 4a and 4b are bounded by a device which maintains the leakage clearance substantially constant.

FIGURE 6 shows a support 25 rigid with the chassis 2 and comprising a plate 26 to which a blade 27 is hingedly connected at 28. A deformable chamber 29 is formed between chassis 2, support 25 and blade 27 by means of a deformable seal 30 fixed between chassis 2 and blade 27, and a flexible seal 31 covering the hinge 28. Into chamber 29 debouches a conduit 32 connected to the cushion supply duct 10. Conduit 32 is fitted with an electrically-operated valve 33 which is capable of being remote-controlled either manually or by a system referenced to the cushion pressure in order to maintain the leakage clearance practically constant notwithstanding variations in the distance of chassis 2 from the track.

Referring lastly to FIGURES 7 through 10, it will be seen that devices similar to that described with reference to FIGURE 6 may be substituted for the walls 11. The space 12 is bounded by plates 34a, 34b, 34c and 34d (the latter not being shown), each bearing a wall 35a, 35b, 35c and 35d (not shown), articulated on hinges 36a, 36b, 36c and 36d (not shown) fixed to chassis 2. Elastic members 37a, 37b, 37c and 37d (not shown), cooperating with shock-absorbers 38, balance the thrust forces acting against the plates.

Fluidtightness between the adjacent plates 34 and the respective walls 35 is ensured by fully flexible elements 38a, 38b of length greater than the distance between the plates or walls they interconnect, whereby not to substantially reduce freedom of movement of the latter. Flexible butt-covers such as 39a, 39b rigid with the fixed walls 14 and bearing against movable walls such as 35c further reduce leaks from the space 12 to the surrounding atmosphere. This space is supplied with pressure-fluid through the duct from a gas generator (not shown) or from a compressor 8.

Flexible elements such as 40a, 40b fixed across the ends of plates such as 34c and having their free ends applied against the inner surface of walls 14 provided the required fluidtightness for maintaining the guiding air cushions.

It goes without saying that many changes and substitutions of parts may be made in the specific form of embodiment hereinbefore described without departing from the spirit and scope of the invention. In particular, the various air cushions may be divided into separate compartments by transverse partition walls.

What is claimed is:

1. A ground effect machine or like body movable over a track having at least one substantially horizontal supporting surface and at least a guiding surface substantially perpendicular to said supporting surface, said machine comprising at least one pressure-fluid cushion cooperating with said horizontal surface for supporting the weight of said machine, at least one pressure-fluid cushion adjoining said supporting cushion and cooperating with said guiding surface for guiding said machine, a wall cooperating with one track surface said wall being common to and separating said supporting cushion and said guiding cushion, and means for supplying one of said cushions with fluid under pressure, the other cushions being supplied by leakage of this fluid between said common wall and the surface of the track.

2. A machine according to claim 1 wherein said track is an inverted-T-shaped track comprising an upstanding central portion having substantially vertical guiding surfaces and substantially horizontal supporting surfaces, and wherein a pressure-fluid source supplies directly said guiding cushion.

3. A machine according to claim 2 wherein the wall common to a supporting cushion and to an adjoining guiding cushion is made of a deformable material.

4. A machine according to claim 3 wherein said common wall extends from the vehicle structure to the guiding surface of the track.

5. A machine according to claim 2 wherein the leakage clearance between said common wall and the guiding surface of the track is twice to six times as much as the tolerance on flatness of the track.

6. A machine according to claim 2 wherein the wall laterally bounding the guiding cushion on the side opposite to the adjoining supporting cushion extends from the body of the machine to a substantially horizontal track surface.

7. A machine according to claim 6 wherein a plurality of walls laterally bounds the guiding cushion on the side opposite to the adjoining supporting cushion.

8. A machine according to claim 6 wherein said walls form a labyrinth seal.

9. A machine according to claim 2 wherein the wall laterally bounding the guiding cushion on the side opposite to the adjoining supporting cushion extends from the body of the machine towards the top of the upstanding central portion.

10. A machine according to claim 2 wherein two guiding cushions arranged on either side of the upstanding central portion are each bounded, on the side opposite to the adjoining supporting cushion, by a wall extending from the body of the machine to the top of the upstanding central portion, the space comprised between the two walls being separated from environment, except for the leakages.

11. A machine according to claim 10 wherein said space is supplied with fluid under pressure.

12. A machine according to claim 2 wherein the walls separating the supporting cushions from environment are movable so as to follow irregularities of the cooperating track surface.

13. A machine according to claim 6 wherein the walls laterally bounding the guiding cushions on the side opposite to the adjoining supporting cushions are movable so as to follow irregularities of the cooperating track surface.

14. A machine according to claim 2 wherein the guiding cushions acting on guiding track surfaces are supplied with fluid by independent pressure-fluid sources.

15. A machine according to claim 14 wherein the output pressure of said pressure-fluid sources increases as the fluid output decrease and vice-versa.

References Cited

UNITED STATES PATENTS 3,369,497   2/1968   Driver et al. _____ 104—23

ANDREW H. FARRELL, Primary Examiner